United States Patent
Kawakami

(10) Patent No.: US 8,055,060 B2
(45) Date of Patent: Nov. 8, 2011

(54) IMAGE PROCESSING APPARATUS CAPABLE OF OPERATING CORRESPONDENCE BETWEEN BASE IMAGE AND REFERENCE IMAGE, METHOD OF CONTROLLING THAT IMAGE PROCESSING APPARATUS, AND COMPUTER-READABLE MEDIUM RECORDING PROGRAM FOR CONTROLLING THAT IMAGE PROCESSING APPARATUS

(75) Inventor: Yuichi Kawakami, Suita (JP)

(73) Assignee: Konica Minolta Holdings, Inc., Tokyo (JP)

( * ) Notice: Subject to any disclaimer, the term of this patent is extended or adjusted under 35 U.S.C. 154(b) by 1055 days.

(21) Appl. No.: 11/904,731

(22) Filed: Sep. 28, 2007

(65) Prior Publication Data

US 2008/0080762 A1  Apr. 3, 2008

(30) Foreign Application Priority Data

Oct. 2, 2006 (JP) .................................. 2006-270736

(51) Int. Cl.
*G06K 9/60* (2006.01)
*G06K 9/34* (2006.01)
*G06K 9/56* (2006.01)

(52) U.S. Cl. ........ 382/154; 382/103; 382/108; 382/118; 382/178; 382/205; 382/280; 382/281; 382/282; 382/294

(58) Field of Classification Search .................. 382/154, 382/103, 108, 118, 172, 205, 278, 280, 281, 382/282, 294
See application file for complete search history.

(56) References Cited

U.S. PATENT DOCUMENTS

| | | | | |
|---|---|---|---|---|
| 4,739,157 A * | 4/1988 | Akashi et al. | ............... | 250/201.8 |
| 5,182,636 A * | 1/1993 | Kikuchi et al. | ............ | 348/225.1 |
| 5,343,309 A * | 8/1994 | Roetling | ...................... | 358/3.07 |
| 5,684,890 A * | 11/1997 | Miyashita et al. | ............ | 382/154 |
| 6,125,198 A * | 9/2000 | Onda | ............................ | 382/154 |
| 6,473,462 B1 * | 10/2002 | Chevance et al. | ......... | 375/240.16 |
| 7,302,065 B2 * | 11/2007 | Furuta | ........................... | 381/94.3 |
| 7,362,911 B1 * | 4/2008 | Frank | ............................. | 382/260 |
| 7,386,163 B2 * | 6/2008 | Sabe et al. | .................... | 382/153 |
| 7,577,299 B2 * | 8/2009 | Kawamata et al. | ........... | 382/210 |

(Continued)

FOREIGN PATENT DOCUMENTS

JP    06-095037 A    4/1994

(Continued)

OTHER PUBLICATIONS

Kim, et al. "Acquisition of 3-D Information Using Stereo Vision System by Relative Stereo Disparity with Subpixel Resolution." Industrial Electronics, 2001. Proceedings. ISIE 2001. IEEE International Symposium on . 3. (2001): 1671-1676.*

(Continued)

*Primary Examiner* — Matthew Bella
*Assistant Examiner* — Michael A Newman
(74) *Attorney, Agent, or Firm* — Sidley Austin LLP

(57) ABSTRACT

An apparatus receives a base image and a reference image that are images picked up by two cameras provided on left and right. A weight coefficient determination portion determines a coefficient for cutting off a high-frequency region of combined phase spectrum of the base image and the reference image, based on an image pickup condition of the camera and texture information of the image in a window centered on a gaze point within the base image.

11 Claims, 11 Drawing Sheets

U.S. PATENT DOCUMENTS

| | | | |
|---|---|---|---|
| 2002/0181749 A1* | 12/2002 | Matsumoto et al. | 382/125 |
| 2004/0013295 A1* | 1/2004 | Sabe et al. | 382/153 |
| 2004/0136571 A1* | 7/2004 | Hewitson et al. | 382/114 |
| 2004/0252909 A1* | 12/2004 | Shinbata et al. | 382/260 |
| 2005/0129305 A1* | 6/2005 | Chen et al. | 382/154 |

FOREIGN PATENT DOCUMENTS

| | | |
|---|---|---|
| JP | 10-055442 A | 2/1998 |
| JP | 2002-245465 A | 8/2002 |
| JP | 2004-144706 A | 5/2004 |
| JP | 2004-289786 A | 10/2004 |
| JP | 2006-10392 A | 1/2006 |
| JP | 2007-078511 A | 3/2007 |

OTHER PUBLICATIONS

Papadimitriou, et al. "Three-dimensional Parameter Estimation from Stereo Image Sequences for Model-based Image Coding." Signal Processing: Image Communication. 7. (1995): 471-487.*

Fleet, David J. "Disparity from Local Weighted Phase-Correlation." Systems, Man, and Cybernetics, 1994. 'Humans, Information and Technology'., 1994 IEEE International Conference on . 1. (1994): 48-54.*

Darabiha, et al. "Reconfigurable Hardware Implementation of a Phase-correlation Stereo Algorithm." Machine Vision and Applications. 17.2 (2006): 116-132.*

Sei Nagashima et al., "Improving Performance for Subpixel Image Matching Based on Phase-Only Correlation", The Society of Instrument and Control Engineers Tohoku Chapter, $218^{th}$ Workshop, material No. 218-15, Oct. 9, 2004, pp. 1-10; with partial English translation.

Japanese Notice of Grounds of Rejection dated Mar. 8, 2011, for counterpart Japanese Application No. 2006-270736—M.A.N., together with an English translation thereof.

Japanese Notice of Grounds of Rejection dated Mar. 8, 2011, for counterpart Japanese Application No. 2006-270736, together with an English translation thereof.

* cited by examiner

BASE IMAGE

REFERENCE IMAGE

IMAGE PROCESSING APPARATUS CAPABLE OF OPERATING CORRESPONDENCE BETWEEN BASE IMAGE AND REFERENCE IMAGE, METHOD OF CONTROLLING THAT IMAGE PROCESSING APPARATUS, AND COMPUTER-READABLE MEDIUM RECORDING PROGRAM FOR CONTROLLING THAT IMAGE PROCESSING APPARATUS

This application is based on Japanese Patent Application No. 2006-270736 filed with the Japan Patent Office on Oct. 2, 2006, the entire content of which is hereby incorporated by reference.

BACKGROUND OF THE INVENTION

1. Field of the Invention

The present invention relates to an image processing apparatus capable of operating correspondence between a base image and a reference image, a method of controlling an image processing apparatus, and a computer-readable medium recording a program for controlling an image processing apparatus.

2. Description of the Related Art

Three-dimensional measurement of a moving image is highly demanded in the filed of face authentication, motion capture, facial expression analysis, utterance analysis, and the like. As such dynamic three-dimensional measurement should follow movement of an object, a passive method such as a stereo method is more suitable than an active method such as scanning with laser beams or the like.

A stereo correspondence search algorithm using phase-only correlation (POC) (an algorithm bringing identical points in images consisting of a base image and a reference image, each of which is a stereo image, into correspondence with each other) has attracted attention in terms of its robustness and high accuracy. More specifically, according to the phase-only correlation method, correlation between a window on the base image and a window on the reference image is determined only based on a phase component, with an amplitude component being ignored. Accordingly, the phase-only correlation is not affected by the difference in brightness of the image caused by variation in gain or offset adjustment of cameras on the left and right, and it is capable of stable measurement. In addition, with attention being paid only on the phase, position deviation can be measured with high accuracy.

Japanese Laid-Open Patent Publication No. 2006-010392 discloses a through hole measurement system applying the phase-only correlation method to a stereo camera.

Sei Nagashima et al., "*Improving Performance for Sub-pixel Image Matching Based on Phase-Only Correlation*," The Society of Instrument and Control Engineers Tohoku Chapter, 218th Workshop, Oct. 9, 2004, material number 218-15, discloses aliasing based on weighting of spectrum and reduction in noise influence in a POC operation.

Accuracy in stereo correspondence depends on a texture of an object. Accordingly, accuracy is deteriorated by noise of the camera in a low-contrast region, and operation of correspondence between the base image and the reference image has not properly been performed.

SUMMARY OF THE INVENTION

An object of the present invention is to provide an image processing apparatus capable of properly performing an operation of correspondence between a base image and a reference image, a method of controlling an image processing apparatus, and a computer-readable medium recording a program for controlling an image processing apparatus.

In order to achieve the above-described object, according to one aspect of the present invention, an image processing apparatus includes: an image input portion receiving a base image and a reference image; a first window setting portion setting a window on the base image; a second window setting portion setting a window on the reference image; a transform portion performing a frequency decomposition upon an image in the window set by the first window setting portion and an image in the window set by the second window setting portion; a weight function setting portion setting a weight function for the frequency-decomposed images based on at least a part of frequency components of the images in the windows; and an operation portion operating correspondence between the base image and the reference image based on the frequency-decomposed image and the weight function.

Preferably, the weight function setting portion calculates a weight coefficient by using an amplitude component for each frequency component of the frequency-decomposed images.

Preferably, the image processing apparatus further includes an image pickup condition input portion receiving an image pickup condition for at least one of the base image and the reference image, and the weight function setting portion sets the weight function based on the image pickup condition.

Further preferably, the weight function setting portion sets to 0, a weight for a frequency range where amplitude component therein has a value not higher than a threshold value determined by a noise level of an image pickup device, based on the image pickup condition.

Alternatively further preferably, the weight function setting portion sets the weight function based on the image pickup condition and based on relative relation between an amplitude component and a noise level of an image pickup device.

Preferably, the weight function setting portion determines a characteristic of a texture based on a ratio between amplitude components at least two frequencies of the image in the window, and sets the weight function based on the characteristic of the texture.

Preferably, the operation portion finds one point in the reference image corresponding to one point in the base image, based on a correlation value between the images in two windows.

Preferably, the image processing apparatus further includes a three-dimensional coordinate operation portion operating a three-dimensional coordinate of an object included in the base image and the reference image, based on a result of operation by the operation portion.

According to another aspect of the present invention, a method of controlling an image processing apparatus includes: an image input step of receiving a base image and a reference image; a first window setting step of setting a window on the base image; a second window setting step of setting a window on the reference image; a transform step of performing a frequency decomposition upon an image in the window set in the first window setting step and an image in the window set in the second window setting step; a weight function setting step of setting a weight function for the frequency-decomposed images based on at least a part of frequency components of the images in the windows; and an operation step of operating correspondence between the base image and the reference image based on the frequency-decomposed images and the weight function.

According to yet another aspect of the present invention, a computer-readable medium recording a control program causing an image processing apparatus to execute the following processing is provided. The processing includes: an image input step of receiving a base image and a reference image; a first window setting step of setting a window on the base image; a second window setting step of setting a window on the reference image; a transform step of performing a frequency decomposition upon an image in the window set in the first window setting step and an image in the window set in the second window setting step; a weight function setting step of setting a weight function for the frequency-decomposed images based on at least a part of frequency components of the images in the windows; and an operation step of operating correspondence between the base image and the reference image based on the frequency-decomposed images and the weight function.

According to yet another aspect of the present invention, an image processing apparatus operating correspondence between a pair of stereo images is provided. The image processing apparatus includes: a window setting portion setting windows on the pair of stereo images respectively; a frequency decomposition portion performing a frequency decomposition upon images in a pair of the windows; a weight value setting portion setting a weight value based on a frequency component of the images in the pair of windows; and an operation portion operating correspondence between the frequency-decomposed images in the pair of windows based on the weight value.

According to these inventions, operation of correspondence between a base image and a reference image can properly be performed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
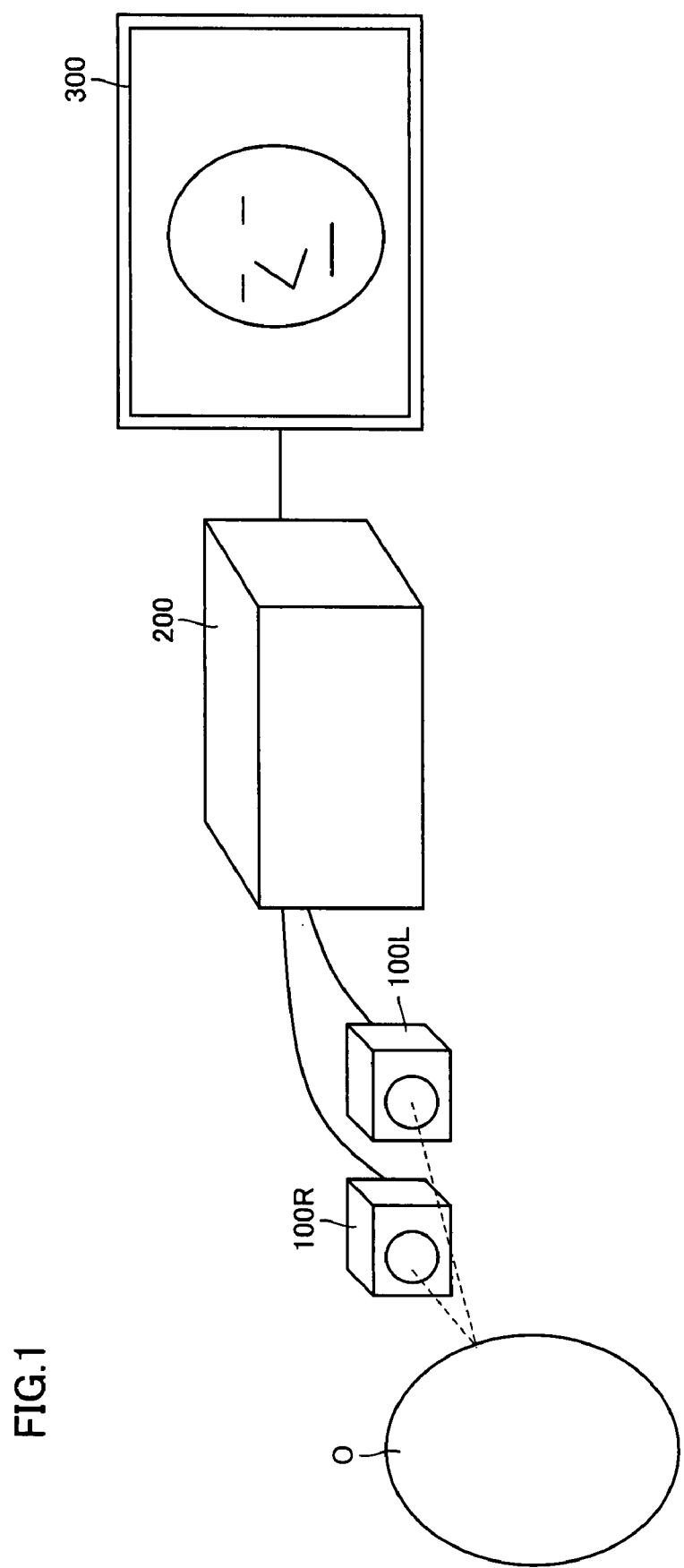
FIG. 1 illustrates a configuration of a three-dimensional measurement apparatus in one embodiment of the present invention.

Referring to FIG. 1, a three-dimensional measurement apparatus in one embodiment of the present invention is constituted of two cameras 100R, 100L arranged on the left and right, a processor 200 connected to the cameras, and a display apparatus 300.

Cameras 100R, 100L pick up a two-dimensional image of an object O (herein a face of a person is illustrated). Camera 100R and camera 100L are provided at a prescribed distance from each other on the left and the right. A stereo image can thus be obtained.

Processor 200 operates a three-dimensional shape of the object from the images picked up by the two cameras. Display apparatus 300 displays the measured three-dimensional shape of the object. Alternatively, obtained data of three-dimensional shape (data of X, Y and Z coordinate) may be stored in a computer-readable medium, without displaying the same.

Figure 2:
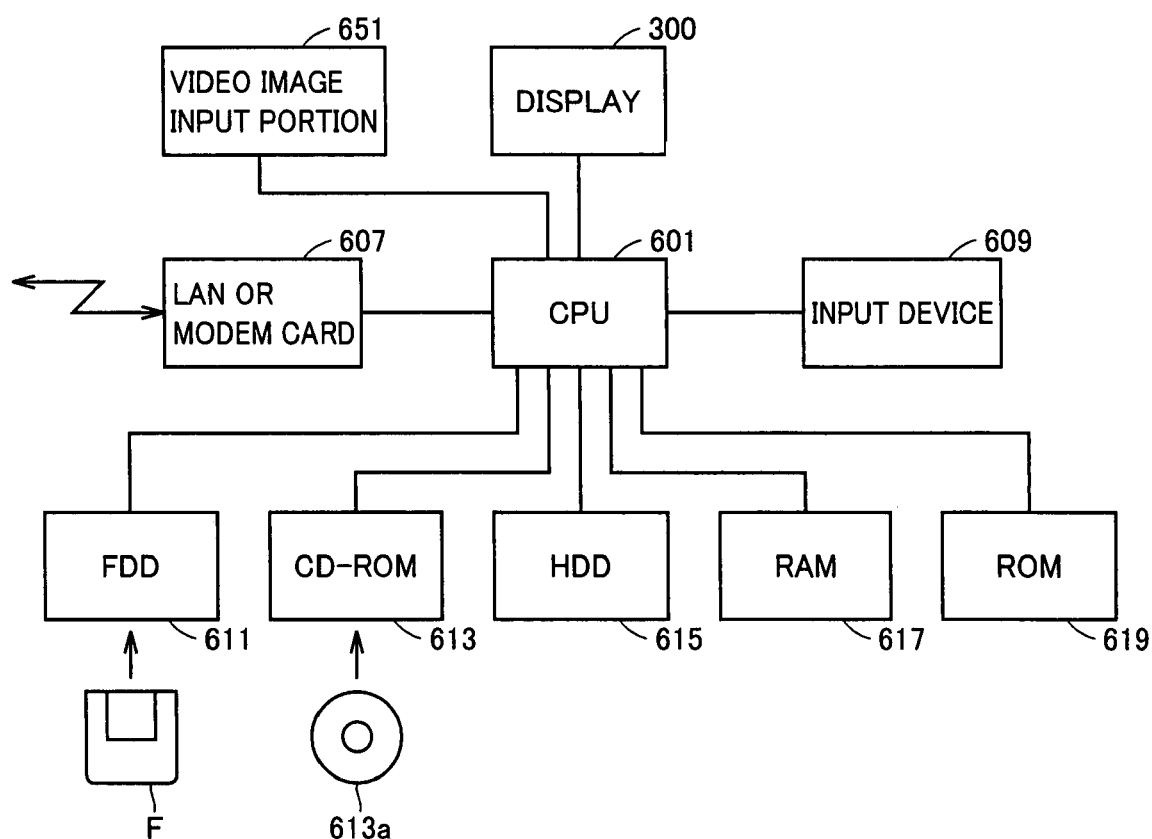
FIG. 2 is a block diagram showing a hardware configuration of a processor 200 in FIG. 1.

Referring to FIG. 2, processor 200 includes a CPU 601 for overall control of the apparatus, a LAN (local area network) card 607 (or a modem card) for connection to a network or for communication with external elements, an input device 609 including a keyboard, a mouse and the like, a flexible disk drive 611, a CD-ROM drive 613, a hard disk drive 615, a RAM 617, and a ROM 619.

Processor 200 receives the image picked up by the camera via a video image input portion 651.

In addition, processor 200 is connected to display apparatus (display) 300.

Processor 200 can read a program or data such as an image recorded in a flexible disk F by means of flexible disk drive 611, and can read a program or data such as an image recorded in a CD-ROM 613a by means of CD-ROM drive 613.

Processor 200 may be provided with a DVD drive, a memory card reader, or the like for input of an image such as a stereo photograph. A hard disk drive is preferably used for storing images.

In addition, a terminal for video signal output to television may be provided, for display of an image such as a photograph.

Figure 3:
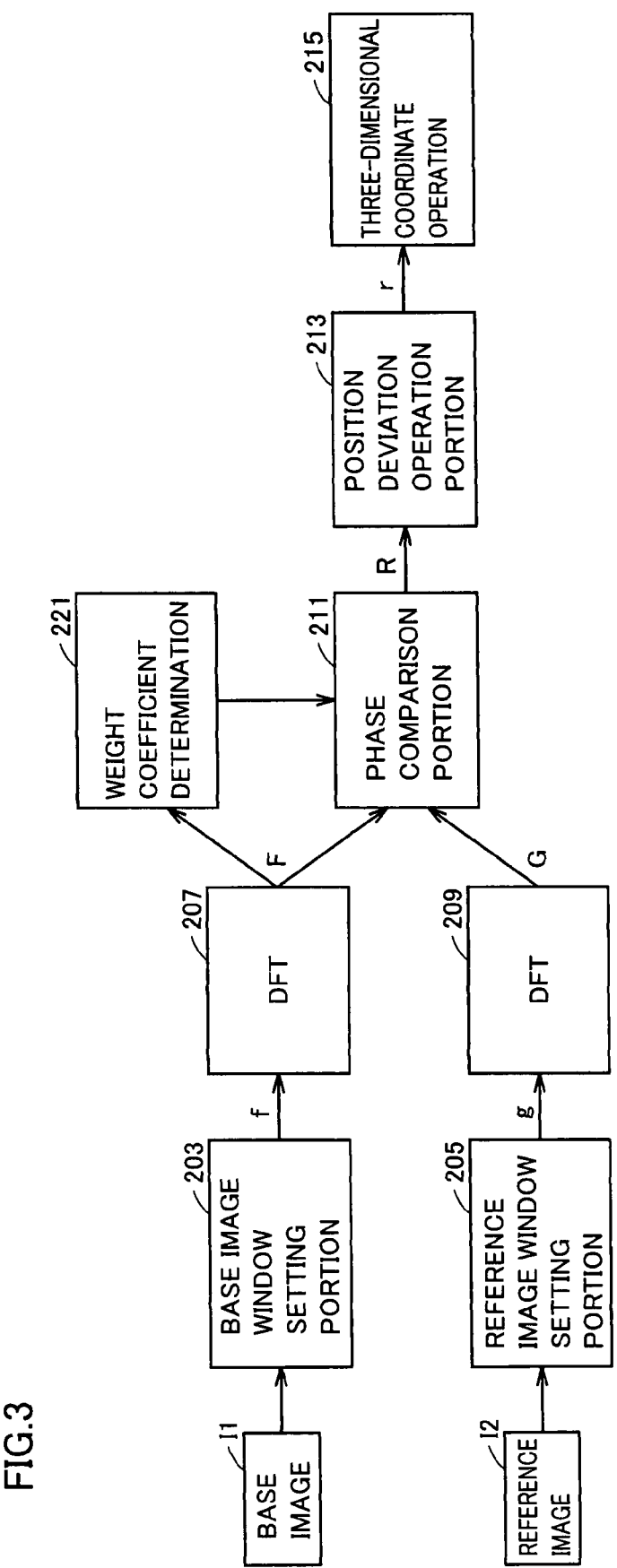
FIG. 3 is a block diagram showing a functional configuration of processor 200.

Referring to FIG. 3, processor 200 receives a base image I1 which is an image picked up by camera 100L and a reference image I2 which is an image picked up by camera 100R.

Processor 200 includes a base image window setting portion 203 setting a position of a window for scanning base image I1, a reference image window setting portion 205 setting a position of a window for scanning reference image I2, a DFT portion 207 performing a frequency decomposition upon a portion of the base image shown in the window, a DFT portion 209 performing a frequency decomposition upon a portion of the reference image shown in the window, a phase comparison portion 211 comparing phases of two frequency-decomposed images, a position deviation operation portion 213 operating deviation between two images, a three-dimensional coordinate operation portion 215 operating a three-dimensional coordinate of the surface of object O based on the position deviation, and a weight coefficient determination portion 221 determining a weight coefficient used in phase comparison portion 211, based on an output of DFT portion 207.

Herein, frequency decomposition refers to processing for decomposing image components arranged two-dimensionally into frequency components, and it is representatively implemented by 2-dimension discrete Fourier transform (2D DFT), discrete cosine transform (DCT), discrete sine transform (DST), Hadamard transform, wavelet transform, and the like. DFT portions 207 and 209 according to the present embodiment representatively perform frequency decomposition processing by using 2-dimension discrete Fourier transform (2D DFT).

It is noted that the image in the window of the base image is denoted by f, the frequency-decomposed image thereof is denoted by F, the image in the window of the reference image is denoted by g, the frequency-decomposed image thereof is denoted by G, combined phase spectrum representing the output of phase comparison portion 211 is denoted by R, and a POC function representing the output of position deviation operation portion 213 is denoted by r.

Figure 4:
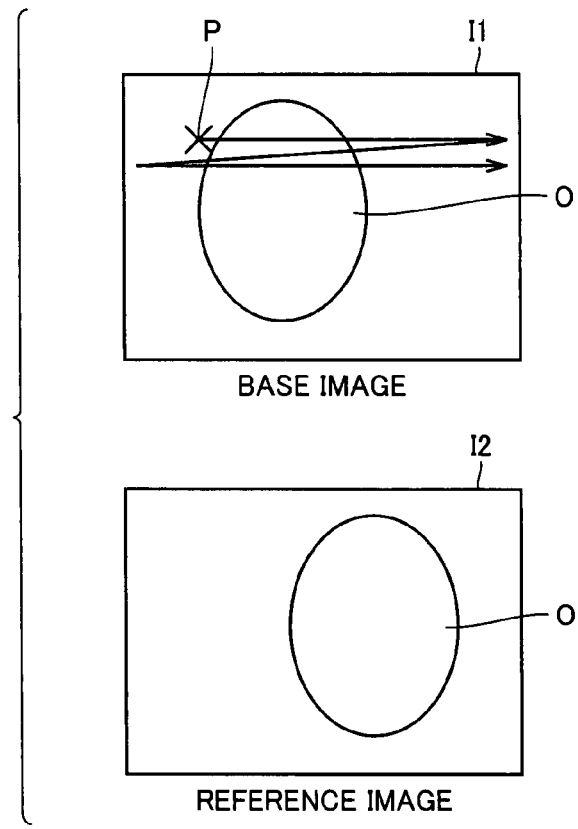
FIG. 4 illustrates scanning of a gaze point.

Scanning of a gaze point P will be described with reference to FIG. 4. Processor 200 sets gaze point P on base image I1 and finds a position corresponding to gaze point P on reference image I2, so as to detect position deviation between these images at the gaze point. The three-dimensional coordinate at that gaze point is operated based on the detected position deviation.

Figure 5:
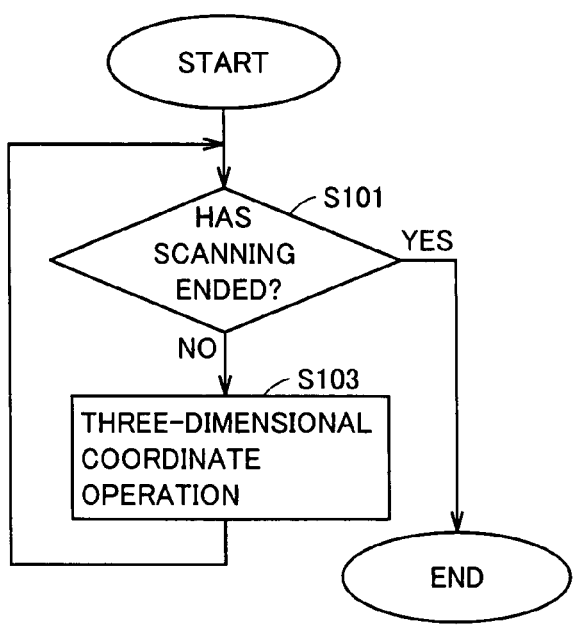
FIG. 5 is a flowchart showing processing for scanning the gaze point.

Processing for scanning the gaze point will be described with reference to FIG. 5. Processor 200 performs operation of the three-dimensional coordinate while moving the gaze point (S103) until scanning ends (NO in S101), and as scanning ends (YES in S101), processor 200 stops the operation. The group of three-dimensional points based on scanning of the gaze point can thus be obtained.

Figure 6:
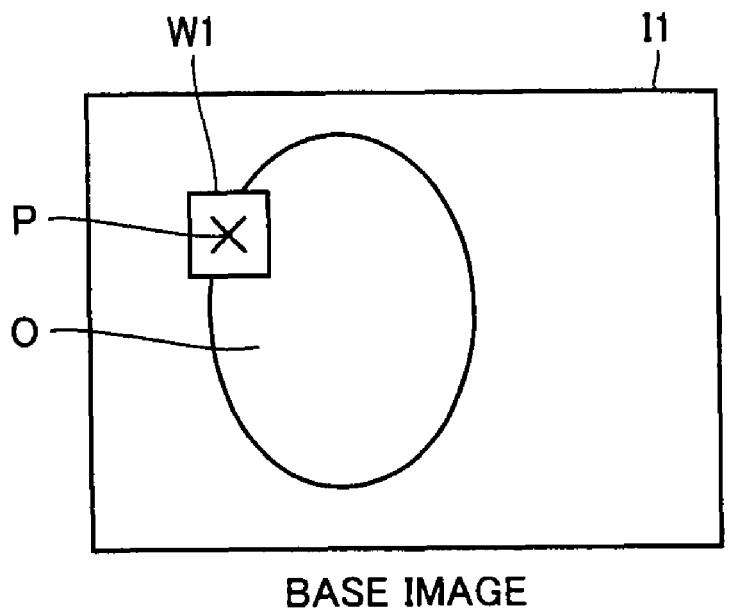
FIG. 6 illustrates window setting processing for a base image.

Window setting processing for the base image will be described with reference to FIG. 6.

Processor 200 sets a window W1 of a prescribed size, centered on gaze point P in base image I1.

Window setting processing for the reference image will be described with reference to FIG. 7. Processor 200 scans a window W2 (equal to window W1 in size and shape) on reference image I2, and sets a pattern closest to the image in window W1 on base image I1 as the corresponding location on the reference image. Determination of closeness can be made by performing an operation of correlation between windows, a SAD (Sum of Absolute Differences) operation, and the like. The point corresponding to gaze point P on base image I1 can thus be set.

Figure 7:
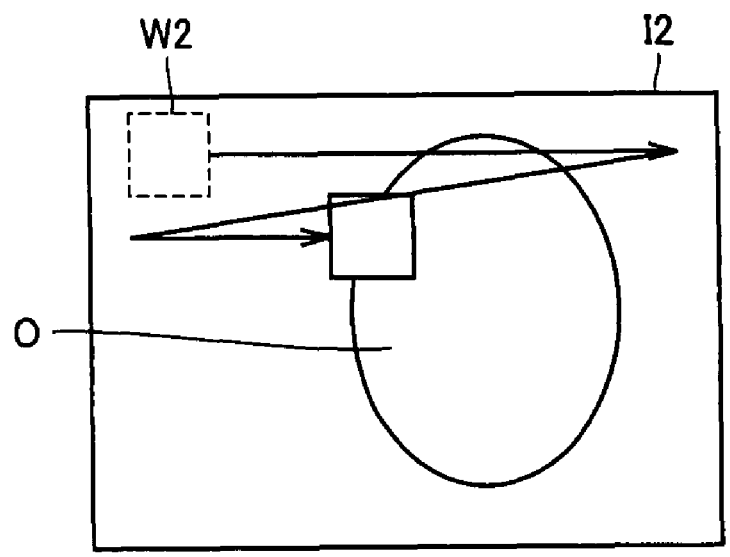
FIG. 7 illustrates window setting processing for a reference image.

The window is moved also in a vertical direction in FIG. 7. So long as two cameras are provided horizontally, however, image deviation between the base image and the reference image occurs only in the horizontal direction. Therefore, the window may be moved only in a horizontal direction.

In addition, as to the window of the reference image, correspondence with the base image may be examined by moving over a wide range, however, correspondence between the base image and the reference image may be examined by determining an "initial value" for search in advance and then moving the window of the reference image only within a prescribed range from the initial value. For example, correspondence between the base image and the reference image is found by using an image of low resolution, and an initial value for an image of high resolution is set by using that result.

Two images having an image size of $N_1 \times N_2$ pixels are expressed as $f(n_1, n_2)$ and $g(n_1, n_2)$ respectively. For the sake of formulation, an index for discrete space is defined as $n_1 = -M_1, \ldots, M_1$ and $n_2 = -M_2, \ldots, M_2$, and the image size is defined as $N_1 = 2M_1 + 1$ pixel and $N_2 = 2M_2 + 1$ pixel. These images subjected to 2-dimension discrete Fourier transform (2D DFT) are expressed as $F(k_1, k_2)$ and $G(k_1, k_2)$ and provided in the following equations, respectively.

$$F(k_1, k_2) = \sum_{n_1 n_2} f(n_1, n_2) W_{N_1}^{k_1 n_1} W_{N_2}^{k_2 n_2} \quad (1)$$
$$= A_F(k_1, k_2) e^{j\theta_F(k_1, k_2)}$$

$$G(k_1, k_2) = \sum_{n_1 n_2} g(n_1, n_2) W_{N_1}^{k_1 n_1} W_{N_2}^{k_2 n_2} \quad (2)$$
$$= A_G(k_1, k_2) e^{j\theta_G(k_1, k_2)}$$

where $$k_1 = -M_1, \ldots M_1, k_2 = -M_2, \ldots, M_2,$$
$$W_{N_1} = e^{-j\frac{2\pi}{N_1}}, W_{N_2} = e^{-j\frac{2\pi}{N_2}}, \text{ and } \sum_{n_1 n_2}$$

is $$\sum_{m_1=-M_1}^{M_1} \sum_{m_2=-M_2}^{M_2}.$$

$A_F(k_1, k_2)$, $A_G(k_1, k_2)$ represent amplitude components of image signals $f(n_1, n_2)$ and $g(n_1, n_2)$ respectively, and $e^{j\theta_F(k_1, k_2)}$, $e^{j\theta_G(k_1, k_2)}$ represent phase components of respective signals. Combined phase spectrum $\hat{R}(k_1, k_2)$ is defined as follows.

$$\hat{R}(k_1, k_2) = \frac{F(k_1, k_2) \overline{G(k_1, k_2)}}{|F(k_1, k_2) \overline{G(k_1, k_2)}|} \quad (3)$$
$$= e^{j\theta(k_1, k_2)}$$

where $\overline{G(k_1, k_2)}$ is a complex conjugate of $G(k_1, k_2)$. In addition, $\theta(k_1, k_2) = \theta_F(k_1, k_2) - \theta_G(k_1, k_2)$.

Figure 8:
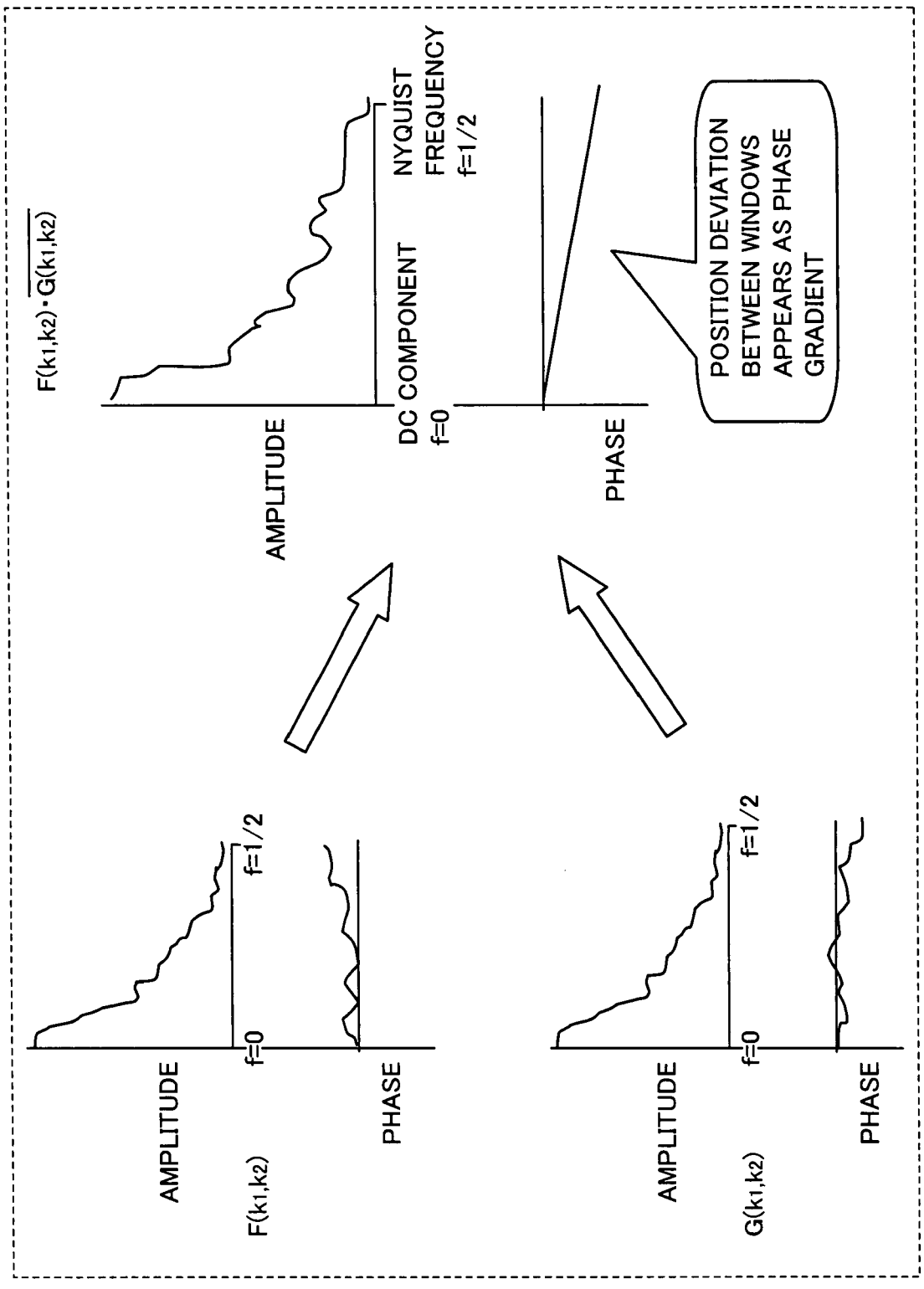
FIG. 8 illustrates first processing performed by a phase comparison portion 211.

First processing performed by phase comparison portion 211 will be described with reference to FIG. 8. DFT portions 207 and 209 calculate $F(k_1, k_2)$ and $G(k_1, k_2)$ respectively, and phase comparison portion 211 calculates combination thereof as follows.

$$F(k_1, k_2) \cdot \overline{G(k_1, k_2)} \quad (4)$$

Position deviation between the images in two windows is expressed as phase gradient in Equation (4).

Second processing performed by phase comparison portion 211 will be described with reference to FIG. 9.

Here, based on the result of operation shown in FIG. 8, processing for calculating combined phase spectrum as follows is performed.

$$\hat{R}(k_1, k_2) = \frac{F(k_1, k_2) \cdot \overline{G(k_1, k_2)}}{|F(k_1, k_2) \cdot \overline{G(k_1, k_2)}|} \quad (5)$$

In addition, the combined phase spectrum is multiplied by a weight function H in accordance with a frequency component as shown below. This is processing for weighting for each frequency component, for robust estimation of the phase gradient.

$$R(k_1,k_2)=H(k_1,k_2)\cdot\hat{R}(k_1,k_2) \quad (6)$$

Initially, position deviation operation portion 213 operates a phase-only correlation (POC) function by subjecting the combined phase spectrum, resulting from comparison of phase in a frequency domain, to inverse Fourier transform.

Phase-only correlation (POC) function $\hat{r}(n_1, n_2)$ is 2-dimension discrete inverse Fourier transform (2D IDFT) of $R(k_1, k_2)$ and defined in the following equation.

$$\hat{r}(n_1, n_2) = \frac{1}{N_1 N_2} \sum_{k_1 k_2} R(k_1, k_2) W_{N_1}^{-k_1 n_1} W_{N_2}^{-k_2 n_2} \quad (7)$$

$$\text{where } \sum_{k_1 k_2} \text{ means } \sum_{k_1=-M_1}^{M_1} \sum_{k_2=-M_2}^{M_2}.$$

Figure 10:
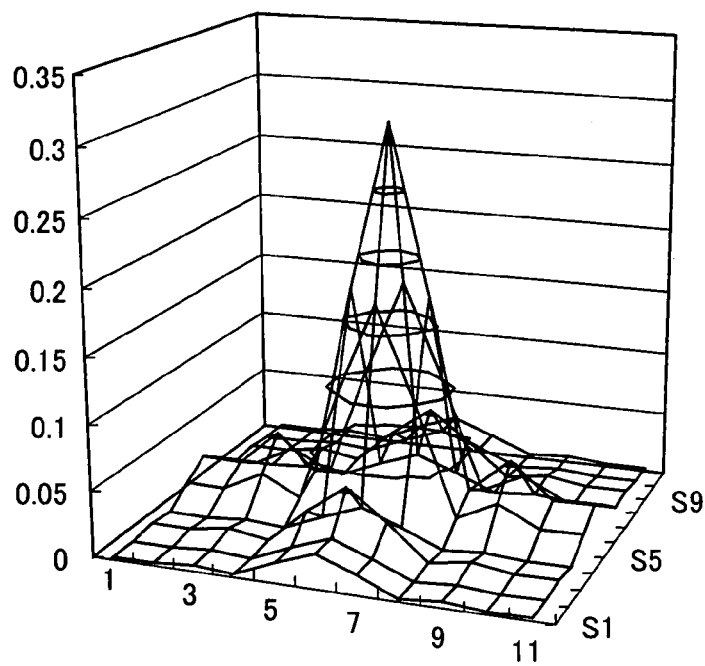
FIG. 10 illustrates a specific example of a phase-only correlation (POC) function.

As shown in FIG. 10, the phase-only correlation (POC) function is prone to have a steep correlation peak in the coordinate of a deviation between images (between the base window and the reference window), and it is characterized by its high robustness in image matching and accuracy in estimation of the deviation. Therefore, position deviation operation portion 213 operates an amount of position deviation between the images by estimating the POC peak. As the POC is calculated discretely, the coordinate of the corresponding point can be found with high resolution by estimating the peak position in a unit of subpixel. In case of performing interpolation, a method of fitting a function such as a parabola or the like may be employed.

Processing performed by three-dimensional coordinate operation portion 215 will be described with reference to FIG. 11.

Figure 11:
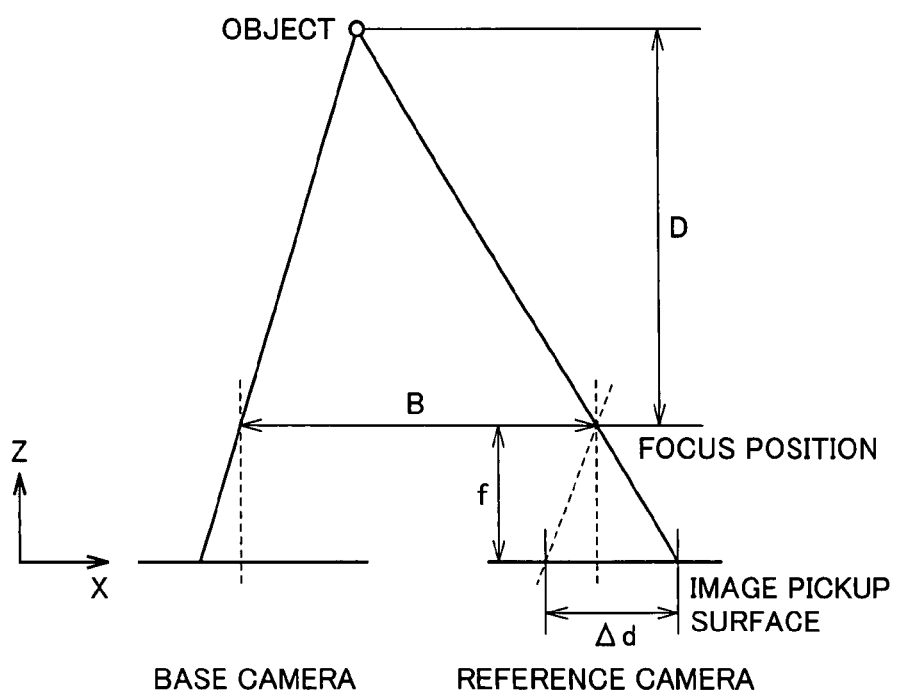
FIG. 11 illustrates processing performed by a three-dimensional coordinate operation portion 215.

Herein, a camera capturing the base image is referred to as a base camera and a camera capturing the reference image is referred to as a reference camera, and FIG. 11 shows a positional relation among an image pickup surface, an object to be picked up, and a focus position.

For the sake of brevity, in the present embodiment, it is assumed that aberration of a stereo camera is satisfactorily adjusted and two cameras are provided in parallel. Even if actual configuration is not under such conditions, an equivalent image may be obtained by image processing.

In FIG. 11, if a difference in the position of the corresponding point between the images captured in the base camera and the reference camera is Δd, a distance D to the object is calculated in the equation below, where a length of the base line of the cameras (distance between optical axes of two cameras) is denoted by B and a focal length of a camera lens is denoted by f.

$$D = \frac{fB}{\Delta d} \quad (8)$$

Three-dimensional position (X, Y, Z) of the object is calculated in the following equation:

$$X = x\frac{D}{f} \quad (9)$$
$$Y = y\frac{D}{f}$$
$$Z = D$$

where x and y represent a coordinate of a gaze pixel on the reference image.

A distance to gaze point P is thus found by using Δd between images obtained in position deviation operation portion 213, and a three-dimensional model can be created.

Figure 12:
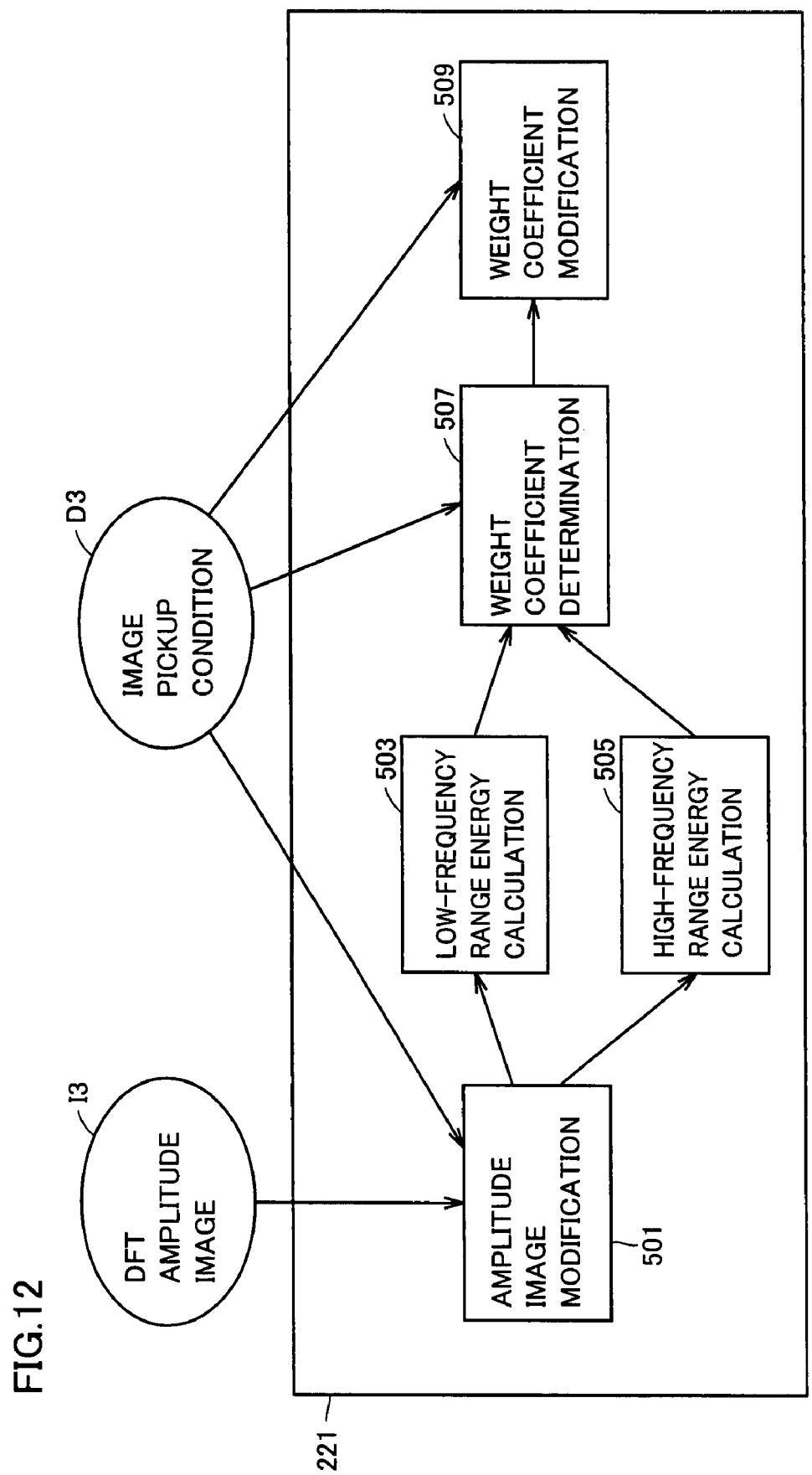
FIG. 12 illustrates a configuration of a weight coefficient determination portion 221.

A configuration of weight coefficient determination portion 221 will be described with reference to FIG. 12.

Weight coefficient determination portion 221 receives a DFT amplitude image 13 and image pickup condition data D3.

Weight coefficient determination portion 221 includes an amplitude image modification portion 501 modifying DFT amplitude image 13 based on the image pickup condition, a low-frequency range energy calculation portion 503 calculating energy in the low-frequency range from the modified amplitude image, a high-frequency range energy calculation portion 505 calculating energy in the high-frequency range from the modified amplitude image, a weight coefficient determination portion 507 determining a weight coefficient based on a result of energy calculation, and a weight coefficient modification portion 509 modifying the determined weight coefficient based on image pickup condition data D3.

Processing by amplitude image modification portion 501 will be described with reference to FIG. 13.

Figure 13:
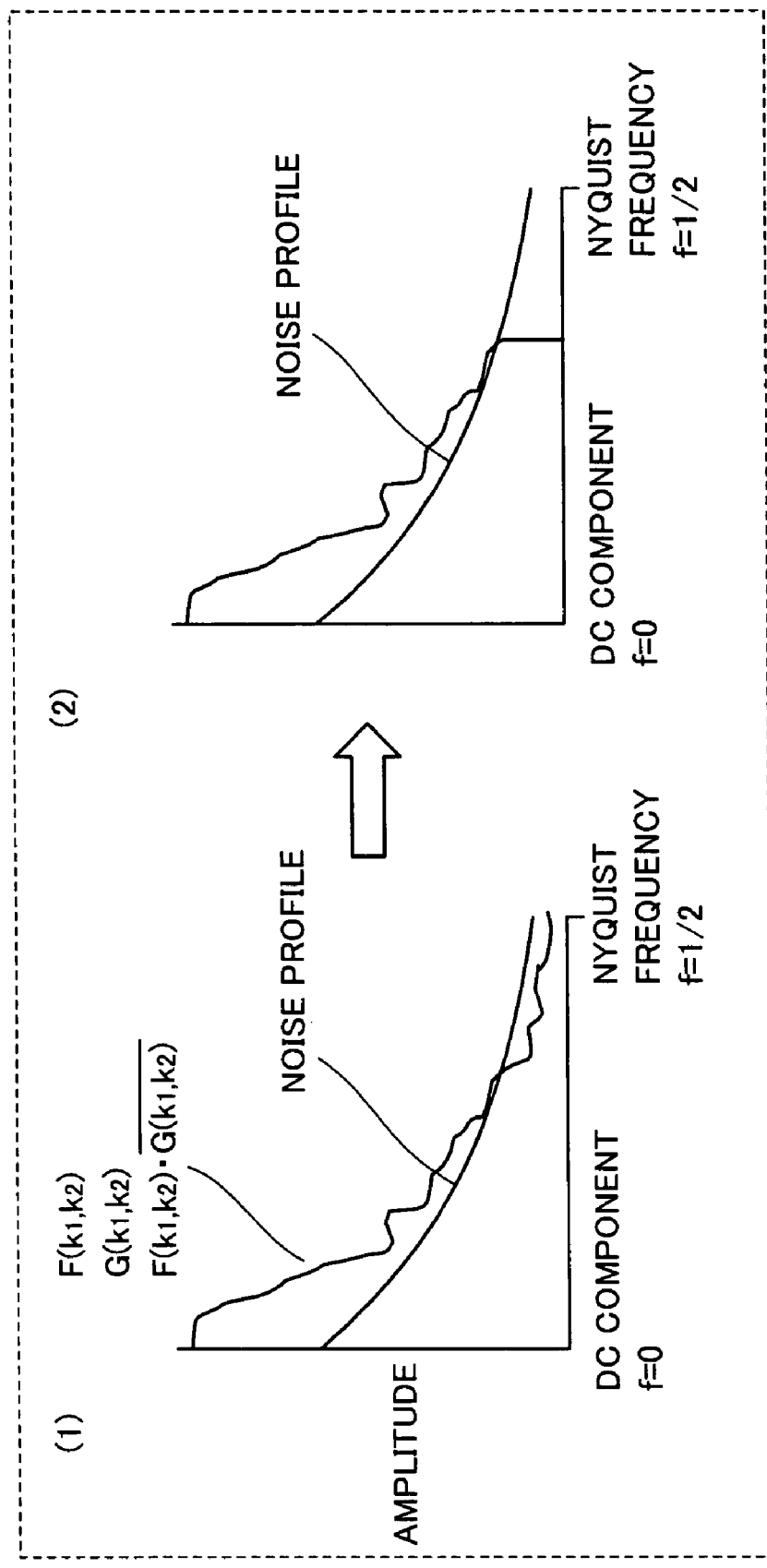
FIG. 13 illustrates processing by an amplitude image modification portion 501.

FIG. 13 shows examples of noise different in amplitude depending on a frequency.

Amplitude image modification portion 501 has a noise profile (obtained based on a result of measurement in advance) for each image pickup condition for a sensor (such as gain, white balance (WB), the number of integrated images, and the like), and cuts off the amplitude component in accordance with each noise profile. Specifically, when the amplitude image as shown in (1) of FIG. 13 is input, amplitude image modification portion 501 cuts off the amplitude component in a high-frequency range in accordance with the image pickup condition, as shown in (2) of FIG. 13.

Figure 14:
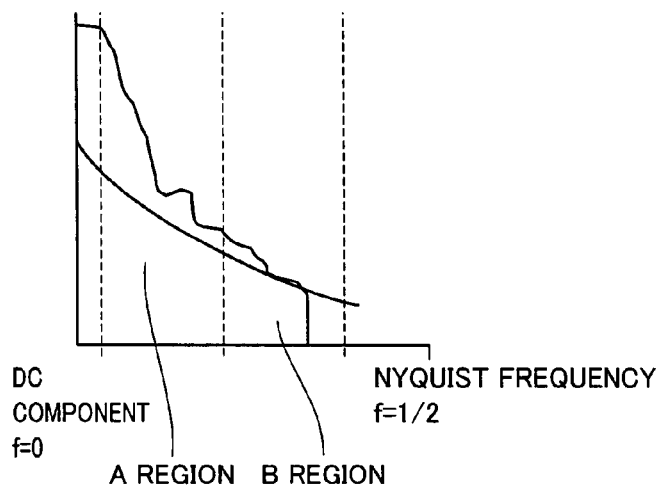
FIG. 14 illustrates an operation of a low-frequency range energy calculation portion 503 and a high-frequency range energy calculation portion 505.

An operation of low-frequency range energy calculation portion 503 and high-frequency range energy calculation portion 505 will be described with reference to FIG. 14.

In the amplitude image output from amplitude image modification portion 501, low-frequency range energy calculation portion 503 calculates the sum of an amount of amplitude in the low-frequency region (A region). This value is referred to as E(A). It is noted that the A region is in a frequency range from p/2n to ¼.

In the amplitude image output from amplitude image modification portion 501, high-frequency range energy calculation portion 505 calculates the sum of an amount of amplitude in the high-frequency region (B region). This value is referred to as E(B). It is noted that the B region is in a frequency range from ¼ to (n−q)/2n.

Thus, the A region and the B region are desirably in a range from at least p/2n to at most (n−q)/2n (p>3, q>3). The frequency component of a wavelength not higher than p/2n is poor in accuracy in converting phase to position deviation, and the frequency component of a wavelength not lower than (n−q)/2n originally contains few signal components and the phase is not reliable.

Processing by weight coefficient determination portion 507 will be described with reference to FIG. 15.

Figure 15:
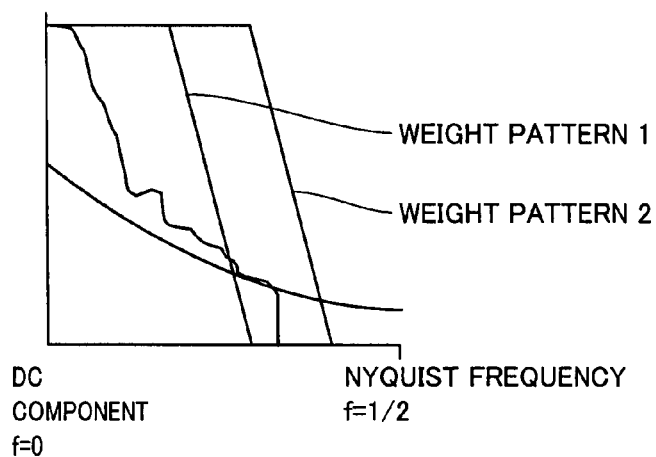
FIG. 15 illustrates processing by a weight coefficient determination portion 507.

As shown in FIG. 15, it is assumed that a weight pattern 1 and a weight pattern 2 are held in advance in the apparatus. Here, weight pattern 1 refers to a weight coefficient for cut-off over a range wider than weight pattern 2.

The weight coefficient is determined as follows (TH represents a threshold value).

If [E(A)/E(B)>TH] weight pattern 1
else weight pattern 2

Namely, when the amount of amplitude is concentrated in the A region, a pattern for cut-off over a wider high-frequency range is selected in order to emphasize that portion.

A ratio between image noise and the texture of the object is different depending on a bright area and a dark area, or positions on the skin (cheek and lips). By adaptively changing a cut-off frequency, in the present embodiment, processing for finding correspondence between windows is performed constantly under an optimal condition.

In addition, the frequency component in the texture of the object and hence the main frequency component are different between the face and the body (or clothing). In the present embodiment, three-dimensional measurement adapted to the object can be performed by using the phase of the frequency component suited to each texture.

Alternatively, a texture analysis portion may perform texture analysis, and based on the result thereof, a preferred pattern may be selected from several weight patterns suitable for the texture that have been prepared in advance. Specifically, a weight profile suitable for an object candidate is used in accordance with the face, clothing (type of design), a background image, and the like.

In the embodiment above, a weight function is selected by using an amount of amplitude of two frequency bands, however, the number of frequency bands, for which an amount of amplitude is calculated, may be three or greater.

Alternatively, instead of preparing weight patterns in advance and selecting one, a weight pattern may be generated, for each frequency band, in accordance with a ratio between an amplitude component of a texture and magnitude of a noise profile based on an image pickup condition of a sensor. A weight pattern optimal for further various textures can thus be set.

Processing by weight coefficient modification portion 509 will be described with reference to FIG. 16.

Figure 16:
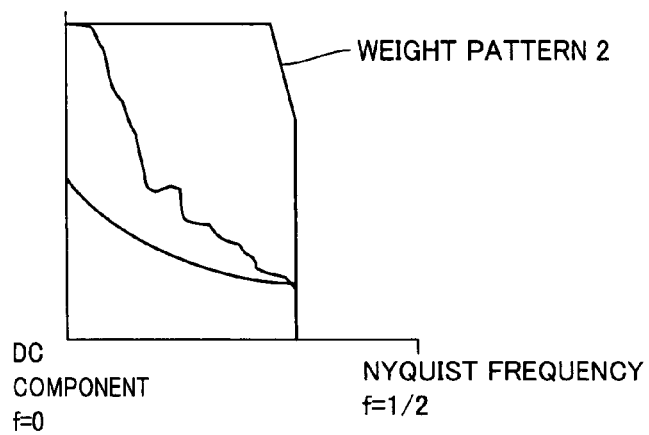
FIG. 16 illustrates processing by a weight coefficient modification portion 509.

Weight coefficient modification portion 509 cuts off a selected weight pattern (weight pattern 2 is illustrated in FIG. 16) in accordance with the noise profile based on the image pickup condition of the sensor, which means that the weight for the frequency range, where amplitude component therein is not higher than the threshold value determined by the noise level of an image pickup device, is set to 0.

Figure 9:
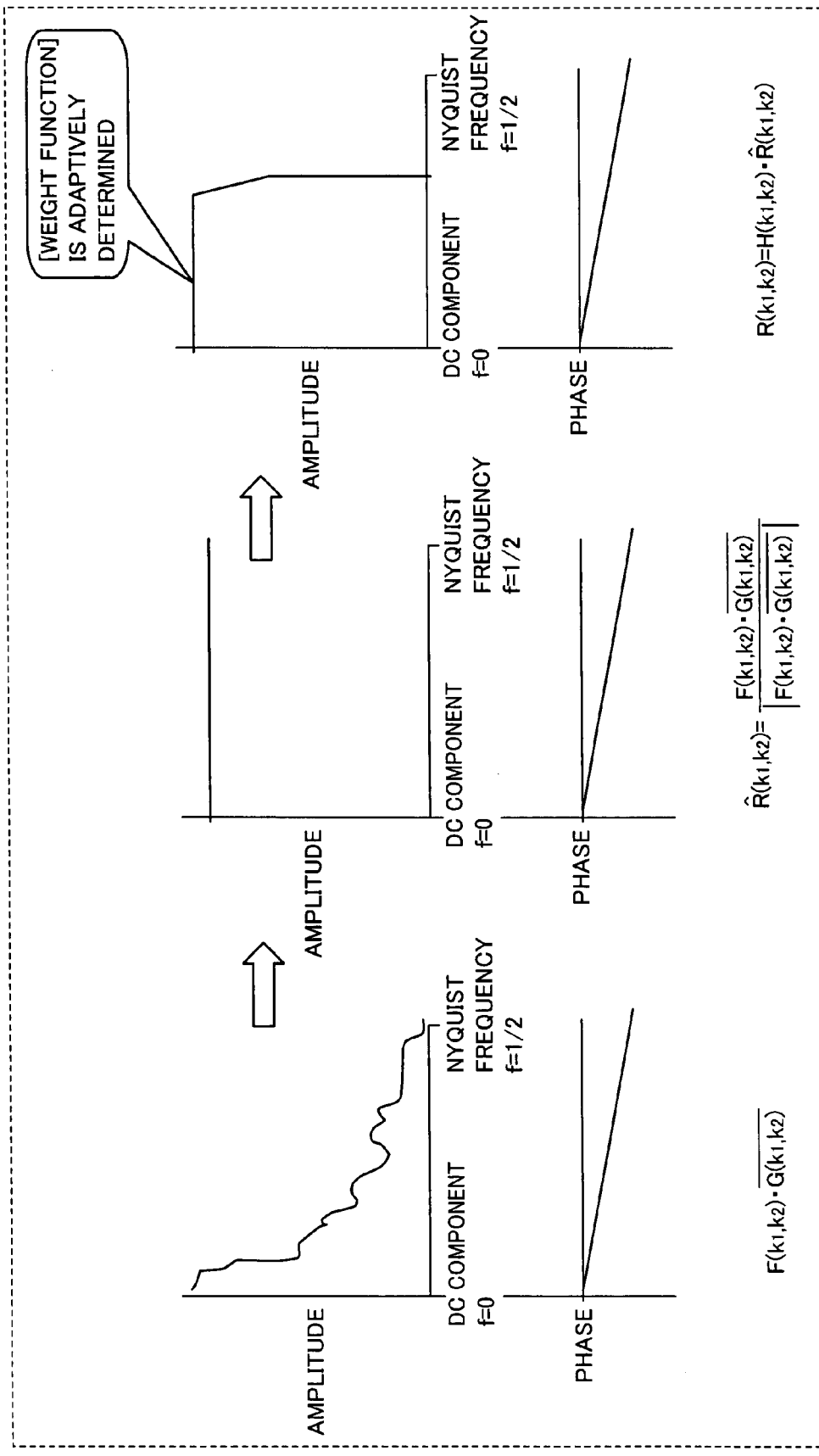
FIG. 9 illustrates second processing performed by phase comparison portion 211.

Weight function $H(k_1, k_2)$ used in the processing in FIG. 9 can thus be obtained.

Effects of the Embodiment

According to the embodiment above, in stereo correspondence using the phase-only correlation (POC) method, a weight for a phase, for which correlation calculation is performed, can adaptively be changed in accordance with frequency characteristics of a texture in a window for correspondence and an image pickup condition of a camera. Generally, in a window region with low contrast, accuracy in correspondence is deteriorated due to influence of image noise. Here, it is possible to adopt a method of reducing the influence of the image noise by restricting a band in a frequency domain, however, use of an identical parameter in the entire image does not bring about band restriction optimal for each window, and influence by noise may be different for each point. In contrast, in the present embodiment, the frequency characteristics are operated for each window at the time of POC operation, and by using the result thereof, the optimal frequency band can be selected in accordance with the frequency characteristics. Accuracy in correspondence over the entire image can thus be improved.

Others

The processing in the embodiment described above may be performed by using software or a hardware circuit.

A program for performing the processing in the embodiment described above may also be provided, and the program may be provided to a user, in a manner recorded in a computer-readable medium such as a CD-ROM, a flexible disk, a hard disk, a ROM, a RAM, and a memory card. Alternatively, the program may be downloaded to an apparatus via a communication line such as the Internet.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing apparatus, comprising:
a camera unit including two cameras for obtaining a base image and a reference image with regard to an object respectively;
an image processor including:
a first window setting portion setting a window on said base image,
a second window setting portion setting a window on said reference image,
a transform portion performing a frequency decomposition upon an image in the window set by said first window setting portion and an image in the window set by said second window setting portion,
a weight function setting portion setting a weight function for said frequency-decomposed images, based on at least a part of frequency components of the images in said windows, and
an operation portion operating correspondence between said base image and said reference image based on the frequency-decomposed images and said weight function; and
an output unit for outputting a result from the image processor,
wherein said weight function setting portion determines a characteristic of a texture based on a ratio between amplitude components at least two frequencies of the image in one of said first window and said second window, and sets the weight function based on the characteristic of the texture.

2. The image processing apparatus according to claim 1, wherein
said weight function setting portion calculates a weight coefficient by using an amplitude component for each frequency component of the frequency-decomposed images.

3. The image processing apparatus according to claim 1, further comprising an image pickup condition input portion receiving an image pickup condition for at least one of said base image and said reference image, wherein said weight function setting portion sets the weight function based on said image pickup condition.

4. The image processing apparatus according to claim 3, wherein
said weight function setting portion sets to 0, a weight for a frequency range where amplitude component therein has a value not higher than a threshold value determined by a noise level of an image pickup device, based on said image pickup condition.

5. The image processing apparatus according to claim 3, wherein
said weight function setting portion sets the weight function based on said image pickup condition and based on relative relation between an amplitude component and a noise level of an image pickup device.

6. The image processing apparatus according to claim 1, wherein
said operation portion finds one point in said reference image corresponding to one point in said base image, based on a correlation value between the images in two windows.

7. The image processing apparatus according to claim 1, further comprising a three-dimensional coordinate operation portion operating a three-dimensional coordinate of an object included in said base image and said reference image, based on a result of operation by said operation portion.

8. A method of controlling an image processing apparatus, comprising:
an image input step of receiving a base image and a reference image;
a first window setting step of setting a window on said base image;
a second window setting step of setting a window on said reference image;
a transform step of performing a frequency decomposition upon an image in the window set in said first window setting step and an image in the window set in said second window setting step;
a weight function setting step of setting a weight function for said frequency-decomposed images based on at least a part of frequency components of the images in said windows; and
an operation step of operating correspondence between said base image and said reference image based on said frequency-decomposed images and said weight function,
wherein said weight function setting step includes:
a step of determining a characteristic of a texture based on a ratio between amplitude components at least two frequencies of the image in one of said first window and said second window, and
a step of setting the weight function based on the characteristic of the texture.

9. A non-transitory computer-readable medium recording a control program causing an image processing apparatus to execute:
an image input step of receiving a base image and a reference image;
a first window setting step of setting a window on said base image;
a second window setting step of setting a window on said reference image;
a transform step of performing a frequency decomposition upon an image in the window set in said first window setting step and an image in the window set in said second window setting step;
a weight function setting step of setting a weight function for said frequency-decomposed images based on at least a part of frequency components of the images in said windows; and
an operation step of operating correspondence between said base image and said reference image based on said frequency-decomposed images and said weight function,
wherein said weight function setting step includes:
a step of determining a characteristic of a texture based on a ratio between amplitude components at least two frequencies of the image in one of said first window and said second window, and
a step of setting the weight function based on the characteristic of the texture.

10. An image processing apparatus operating correspondence between a pair of stereo images, comprising:
a camera unit including two cameras for obtaining the pair of stereo images with regard to an object;
an image processor including:
a window setting portion setting windows on the pair of stereo images respectively,
a frequency decomposition portion performing a frequency decomposition upon images in a pair of said windows,
a weight value setting portion setting a weight value based on frequency components of the images in said pair of windows, said weight value setting portion determining a characteristic of a texture based on amplitude components at least two frequencies of the image in the set of windows on one of the stereo images, and setting the weight value based on the characteristic of the texture, and
an operation portion operating correspondence between said frequency-decomposed images in said pair of windows based on said weight value; and
an output unit for outputting a result from the image processor.

11. An image processing apparatus operating correspondence between a pair of stereo images, comprising:
a storing portion configured to store the pair of stereo images obtained by a camera with regard to an object;
an image processor including:
a window setting portion setting windows on the pair of stereo images respectively,
a frequency decomposition portion performing a frequency decomposition upon images in a pair of said windows,
a weight value setting portion setting a weight value based on frequency components of the images in said pair of windows, said weight value setting portion calculating amplitude components at least two frequency ranges of the image in the set of windows on one of the stereo images, and setting the weight value based on the amplitude components, and
an operation portion operating correspondence between said frequency-decomposed images in said pair of windows based on said weight value; and
an output unit for outputting a result from the image processor.

* * * * *